J. BECK.
Carriage-Seat.
No. 61,507.    Patented Jan. 29, 1867.
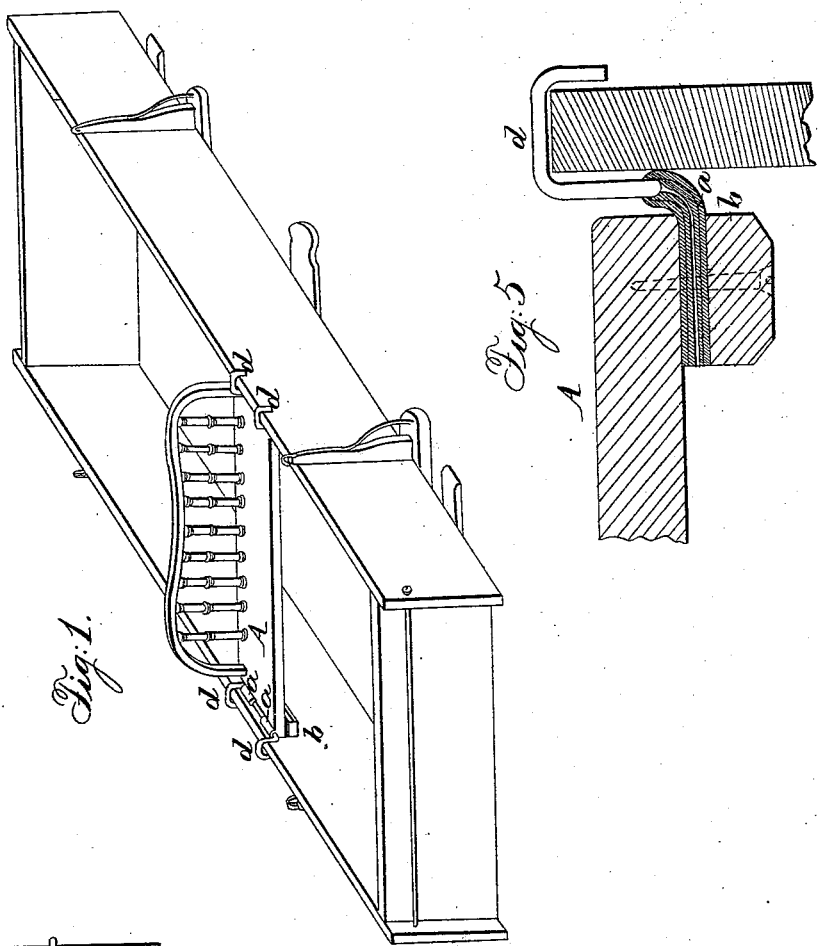
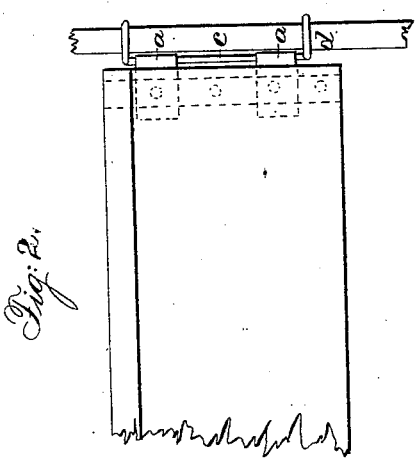
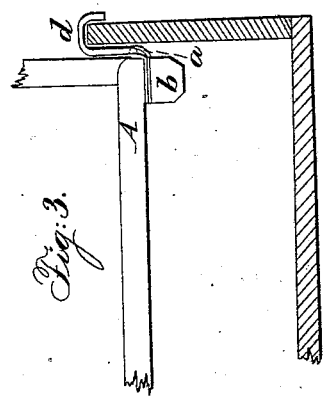
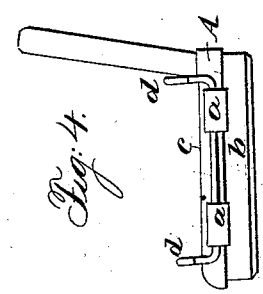
Witnesses.
Inventor
Jacob Beck

United States Patent Office.

JACOB BECK, OF WILLIAMSVILLE, ILLINOIS.

Letters Patent No. 61,507, dated January 29, 1867.

IMPROVEMENT IN WAGON SEATS.

The Schedule referred to in these Letters Patent and making part of the same.

TO ALL WHOM IT MAY CONCERN:

Be it known that I, JACOB BECK, of the town of Williamsville, in the county of Sangamon, and State of Illinois, have invented certain new and useful improvements in Rubber Suspension Seats for Wagons; and I do hereby declare that the following is a full, clear, and exact description thereof, reference being had to the accompanying drawings, making a part of this specification, in which—

Figure 1 is a perspective view of a wagon box with seat attached.
Figure 2, a top or plan view of seat.
Figure 3, a front view of seat.
Figure 4, an end view of seat; and
Figure 5, a front view of one end enlarged.
Like letters refer to similar parts in all of the figures.

The nature and object of my invention consist in attaching rubber springs to a wagon or carriage seat by means of rods and hooks, so that the seat can be removed from or attached to any ordinary wagon box, and be suspended therefrom so that the seat will incline or accommodate itself to the position of the bodies of the persons using the same, and adapted to the weight of such persons. In the rural or farming districts many persons are not able to keep both wagons and carriages, and many devices have been adopted to give elasticity or a spring to wagon seats; and elliptic steel springs, half springs, spring poles, and other devices, have been used to overcome the severe jolt of having rigid wagons. My device overcomes this difficulty in a simple and convenient manner.

To enable others skilled in the art to make and use my invention, I will proceed to describe its construction and operation.

The wagon with the box is made in any of the forms known to wagon-makers. I then make any kind of a seat which will pass inside of the box, leaving about two inches between the end of the seat and the side of the box. The seat, A, may be made in a finished shape with back, or it may be a single board. At the ends, and near each corner, as shown, I attach rubber springs, $a$ $a$, in any convenient and safe manner. The easiest way is by screwing on a cross-piece, $b$, as shown, as it holds the springs and strengthens the seat. The springs $a$ $a$ are usually made of rubber prepared with cloth, so as to preserve its elasticity, such as is preferred for beds, suspenders, &c. I take one, two, or three pieces, as may be desired, for each spring, cut them so that they will fold of sufficient length, and fasten the ends under the seat, as shown, leaving loops about four inches long. I then run the rod $c$ through these loops. The rods $c$ have hooks, $d$, at each end, which are hooked on to the box as shown, or bolted to the side of the wagon without hooks, so that the spring loops can be slipped over the end. The hooks require to be bent sufficiently to prevent the springs from rubbing against the box. When wagons are left out of doors or in the sun a separate piece of wood or cloth should be placed over the springs to prevent injury to them by exposure. This arrangement of springs is easily attached to any ordinary wagon, and in operation these springs not only act as ordinary springs, but allow the seat to swing from side to side, so as to relieve any side motion; and as the springs are composed of several separate pieces, (or may be so made,) they can be changed from a stiff to a light spring by withdrawing the rod $c$ from the centre of the spring loop, and placing it in the outer one, so that the seat is suspended by single loops or strips of rubber, and they can be changed in this manner by changing one end of the seat and not the other, so that a light and heavy person can be balanced on the same seat. For low boxes a wider piece can be placed under the seats, so as to elevate them to any desired position; and I usually attach a strap from the rod $c$ to the seat A, so as to prevent the springs from being brought to their utmost tension, or breaking when suddenly moved. This strap may, however, be attached to the box and seat instead of the rod.

I do not claim broadly as my invention the providing of wagon seats with springs, but what I claim as new, and desire to secure by Letters Patent, is—

The wagon seat A, provided with suspension rubber springs $a$, in combination with a wagon box, provided with two or more rods $c$, substantially as and for the purposes specified.

JACOB BECK.

Witnesses:
L. L. BOND,
E. A. WEST.